United States Patent [19]

Erani

[11] Patent Number: 4,667,542
[45] Date of Patent: May 26, 1987

[54] SAW BLADE SHARPENING FIXTURE
[75] Inventor: Homi K. Erani, Aberdeen, S. Dak.
[73] Assignee: K. O. Lee Company, Aberdeen, S. Dak.
[21] Appl. No.: 837,753
[22] Filed: Mar. 10, 1986
[51] Int. Cl.⁴ ............................................. B23D 63/14
[52] U.S. Cl. ............................................ 76/79; 76/43
[58] Field of Search ...................... 76/37, 43, 78 R, 79, 76/40, 41, 42

[56] References Cited

U.S. PATENT DOCUMENTS

| | | |
|---|---|---|
| 2,213,413 | 9/1940 | Shaw . |
| 2,574,499 | 5/1948 | Ruscitti et al. . |
| 2,580,812 | 1/1952 | McEwan . |
| 2,775,146 | 12/1956 | McEwan . |
| 2,801,554 | 8/1957 | Iveson . |
| 2,875,648 | 3/1959 | Garrison . |
| 3,109,327 | 11/1963 | McConnell . |
| 3,313,185 | 4/1967 | Drake et al. . |
| 3,364,797 | 1/1968 | Sattler . |
| 3,583,260 | 6/1971 | Bond ........................................ 76/43 |
| 3,759,118 | 9/1973 | Glas ......................................... 76/43 |
| 3,766,806 | 10/1973 | Benner . |
| 3,815,446 | 6/1974 | Murphy . |
| 3,903,760 | 9/1975 | Jones ....................................... 76/79 |
| 4,102,224 | 7/1978 | Wright .................................... 76/79 |
| 4,124,157 | 11/1978 | Walker .................................... 76/79 |
| 4,434,684 | 3/1984 | Nixon ...................................... 76/79 |
| 4,471,673 | 9/1984 | Rosenquist ............................. 76/79 |

OTHER PUBLICATIONS

Autool Grinder Model TCT/4 BMC Installation and Operating Instructions.

Primary Examiner—Roscoe V. Parker
Attorney, Agent, or Firm—Jacobson and Johnson

[57] ABSTRACT

A gimbal-like device having an arbor for holding a circular saw blade mounted on an angled arm which is attached to a carrier plate which is pivotable about one axis and rotatable about another axis with the carrier mounted on a turntable for swinging the fixture about a third axis whereby the saw blade can be located at various angular positions for grinding or sharpening the teeth of the blade by a planar grinder such as a surface on a vertical grinding or sharpening wheel.

8 Claims, 24 Drawing Figures

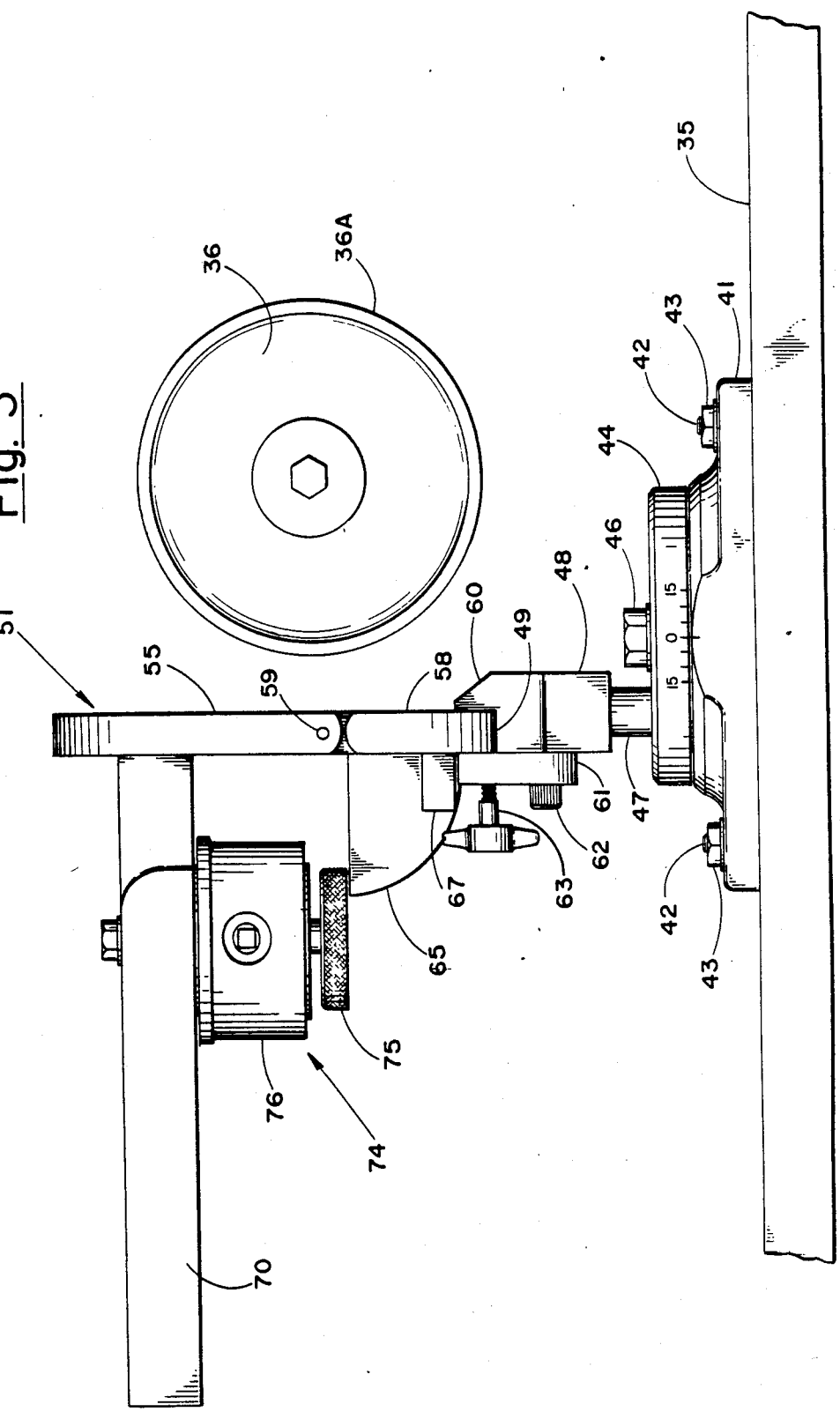

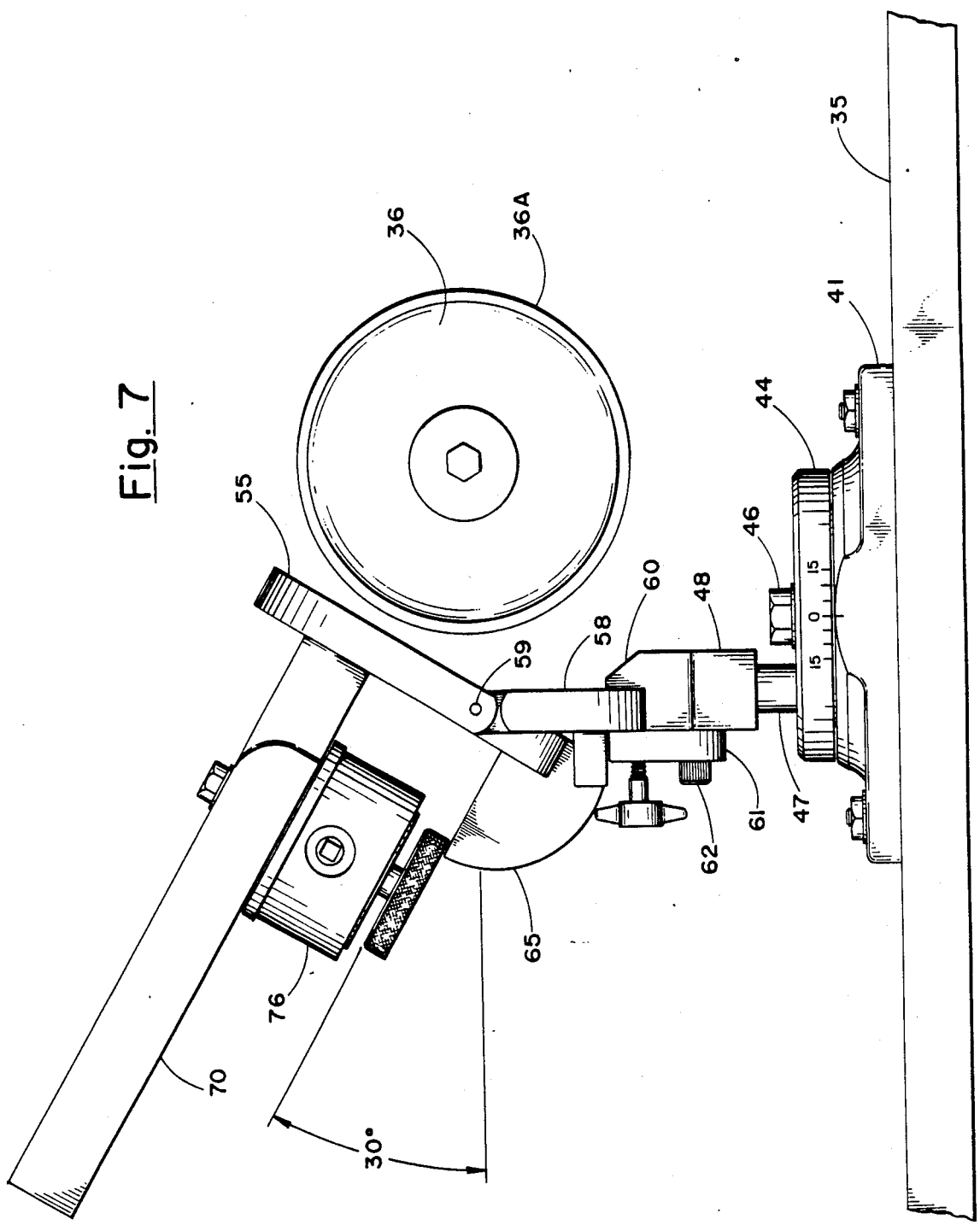

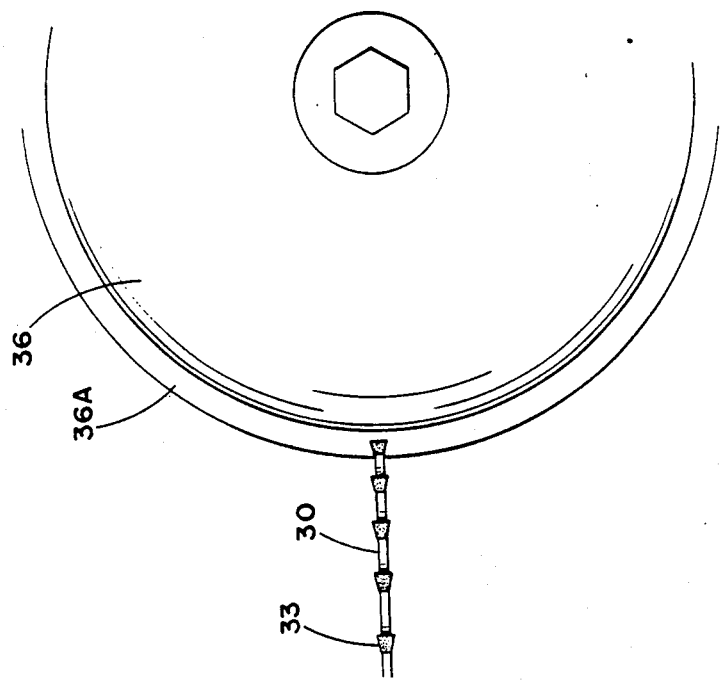
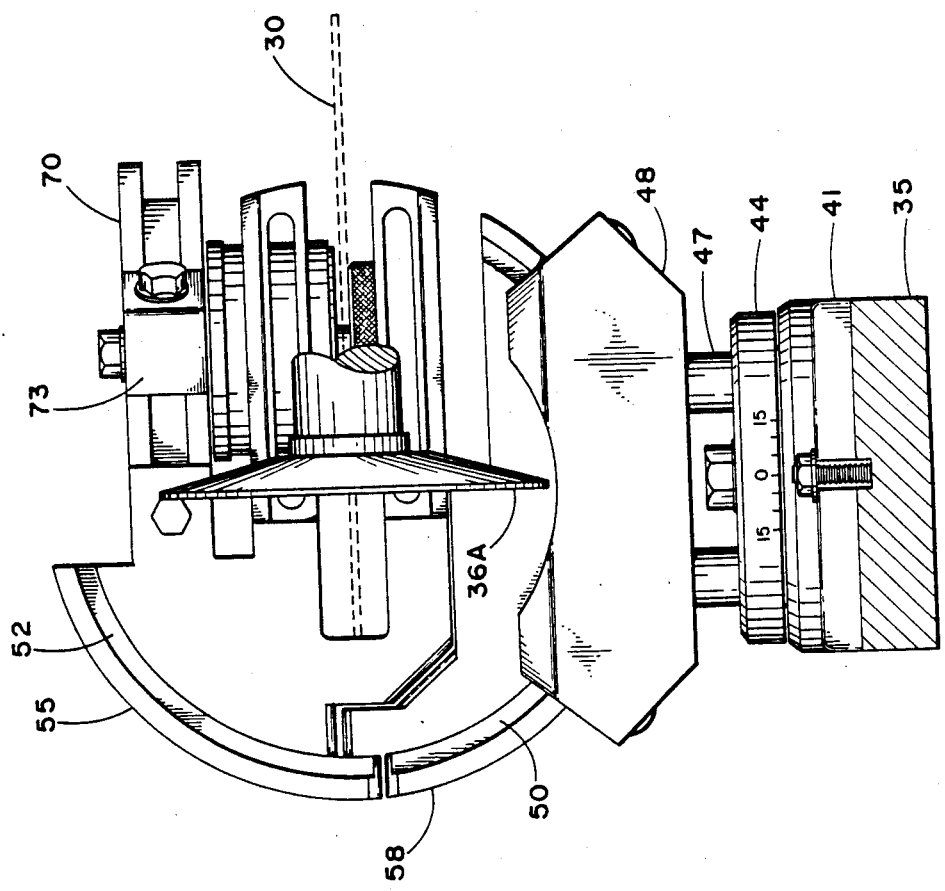

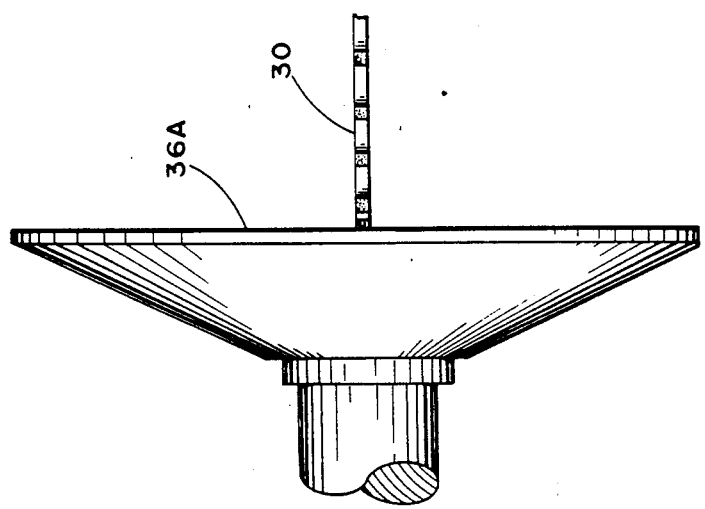
Fig. IIA
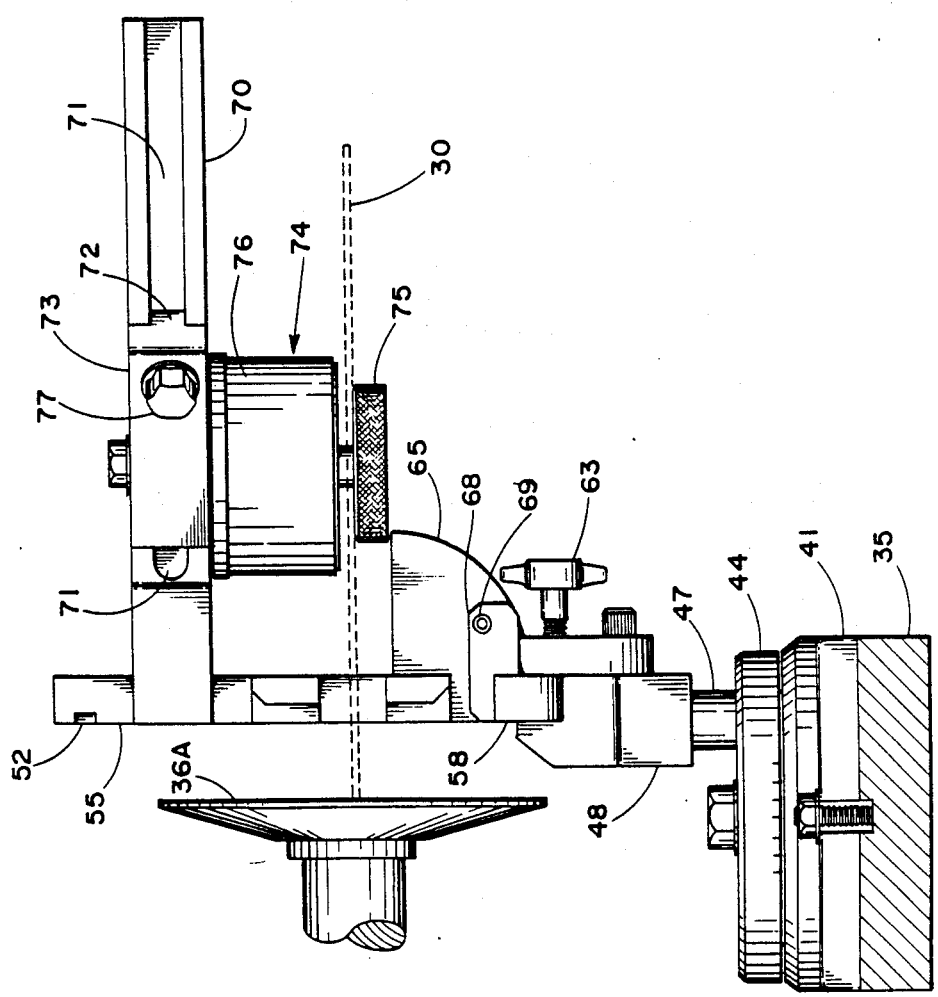
Fig. II

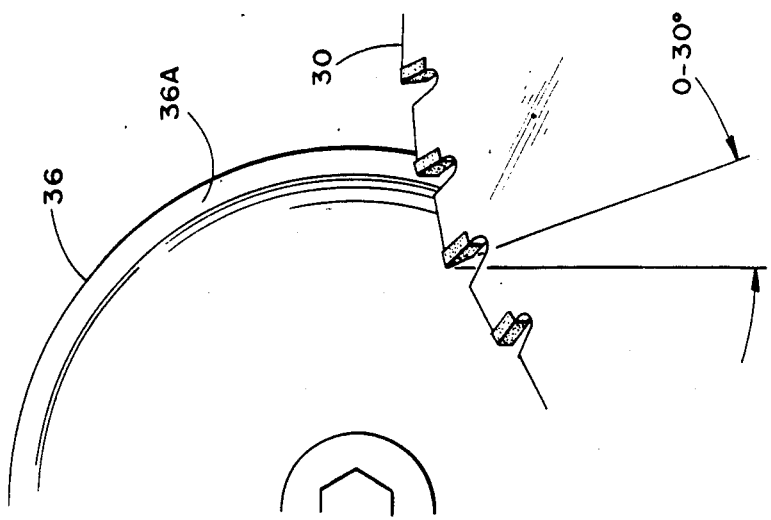
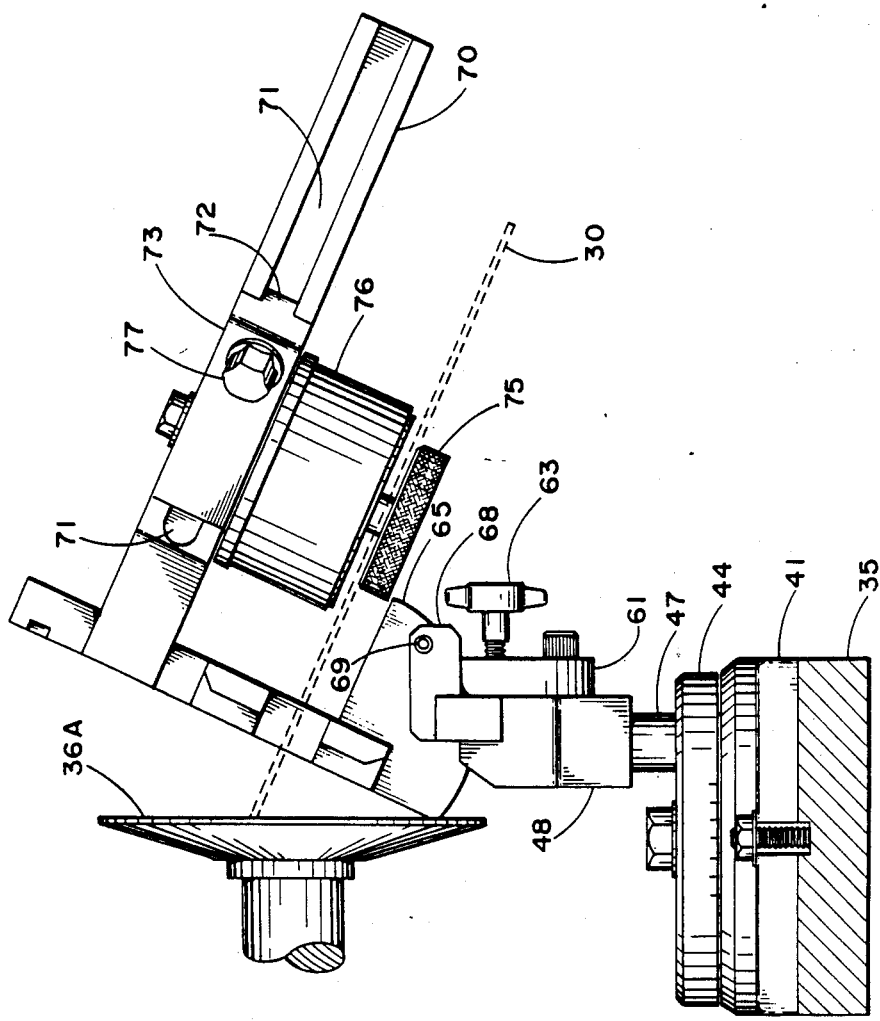

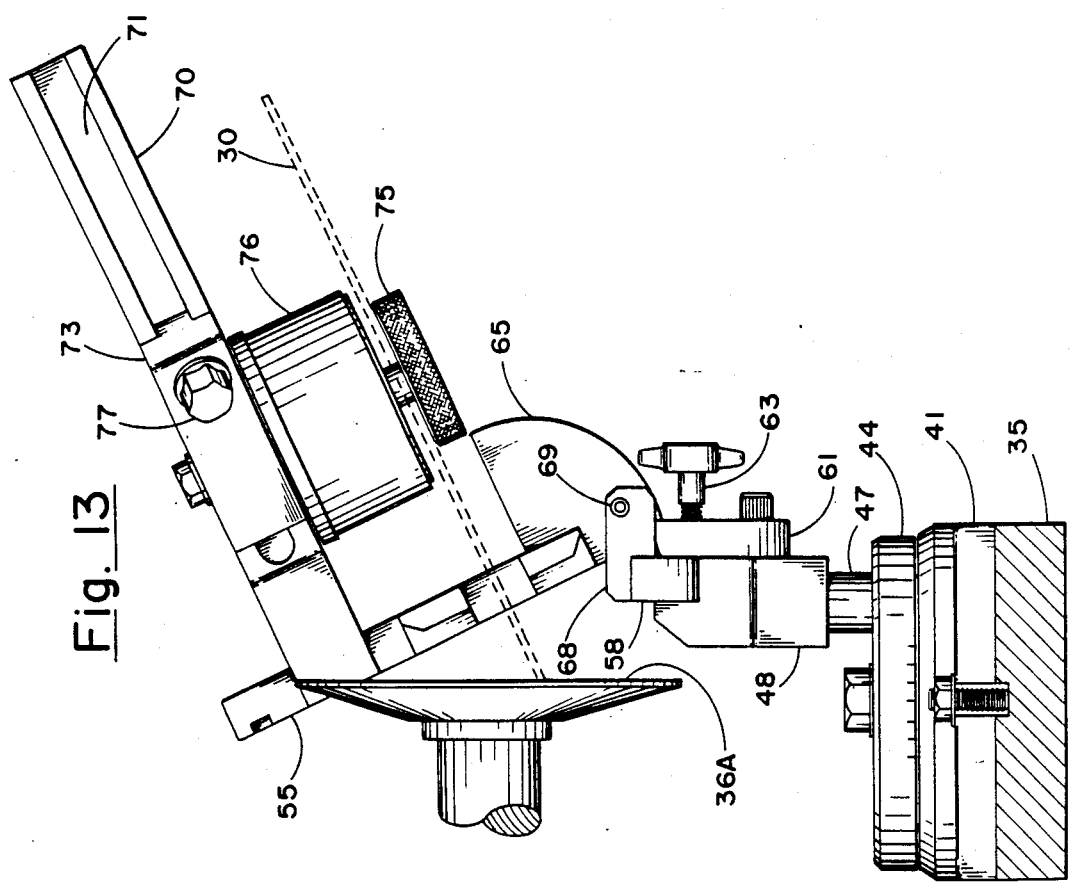

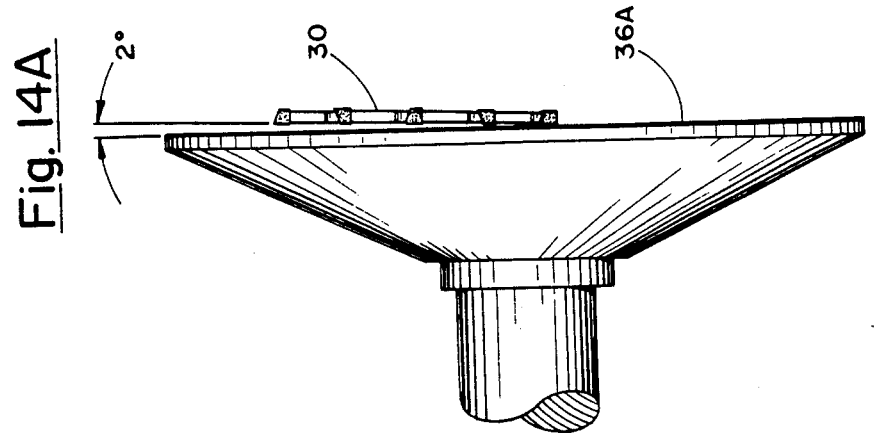
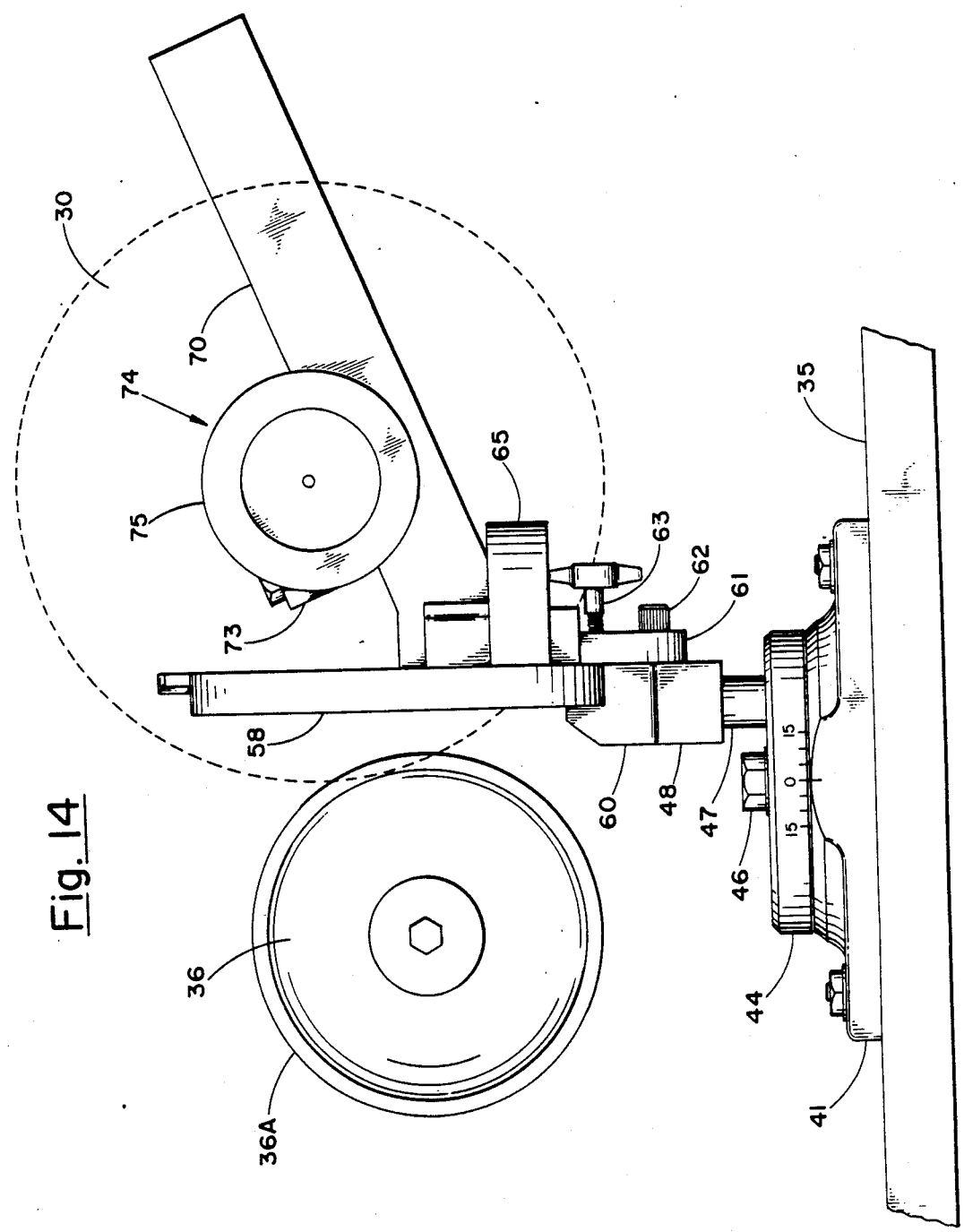

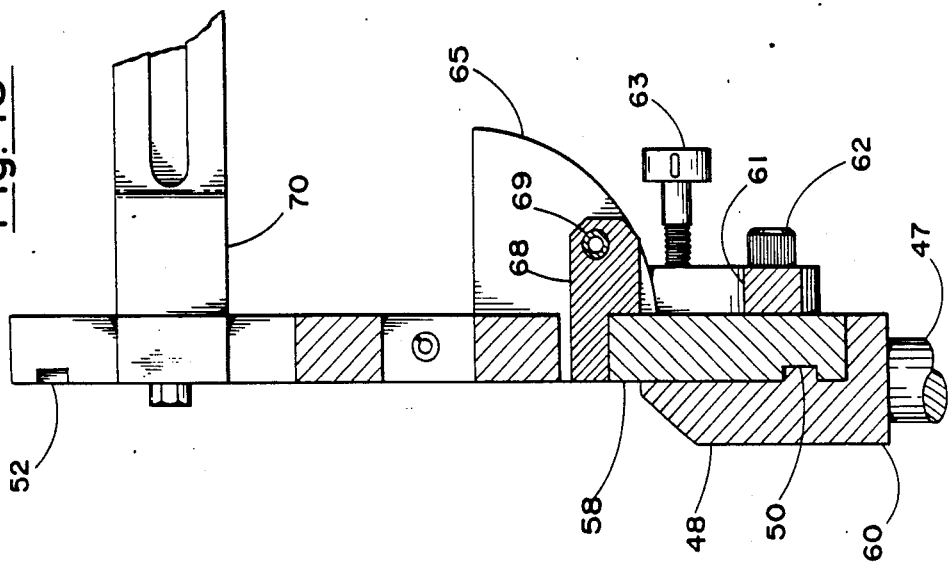
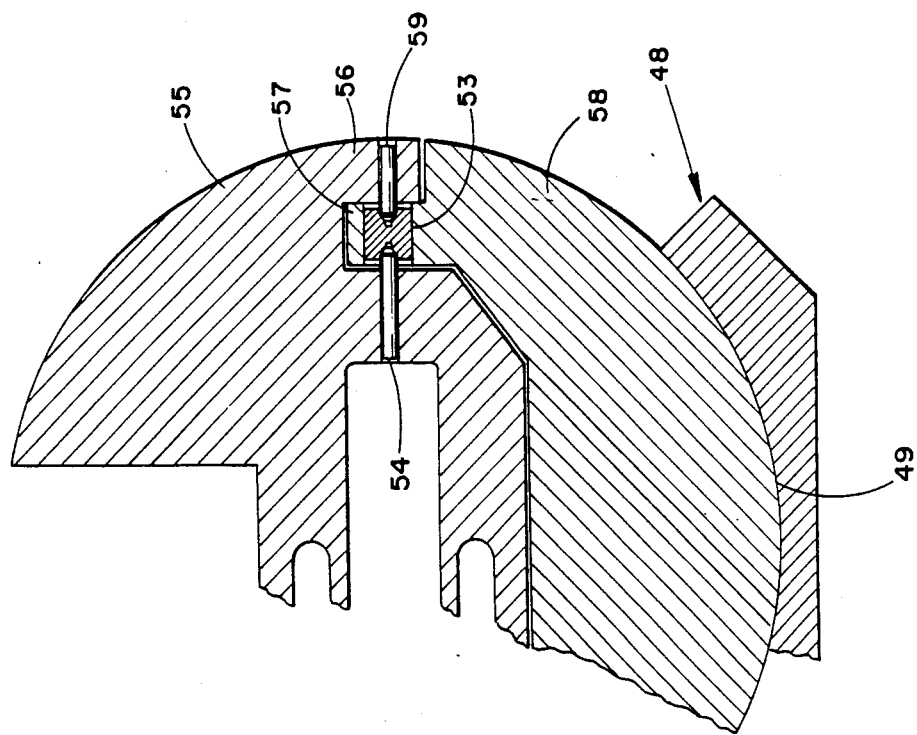

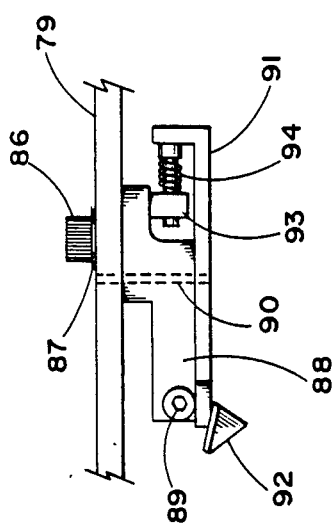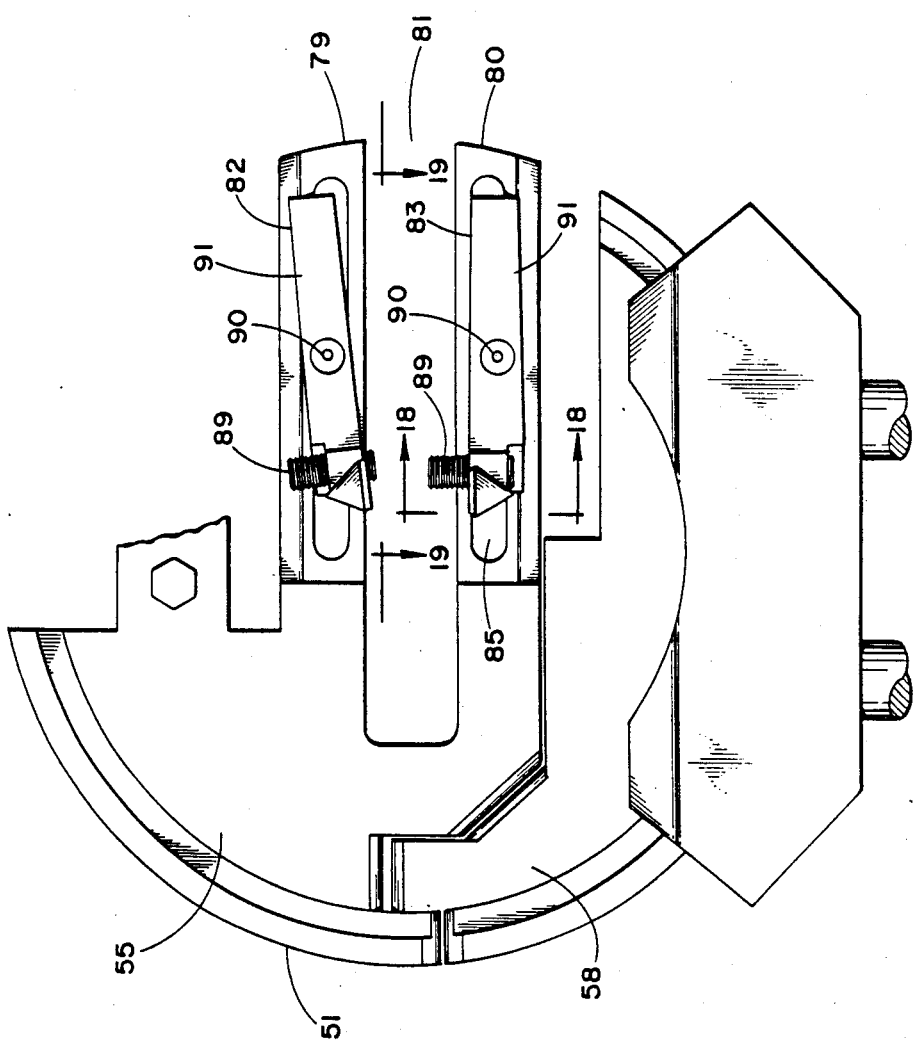

4,667,542

SAW BLADE SHARPENING FIXTURE

FIELD OF THE INVENTION

This invention is for a fixture for holding a circular saw blade when sharpening the peripheral teeth on the blade. More particularly, it is directed toward a fixture for holding a circular saw blade so that the various parts of the teeth can be ground or sharpened at various angles with a vertical planar surface such as on a rotating grinding wheel without removing the blade from the fixture

DESCRIPTION OF THE PRIOR ART

There are a number of fixtures for holding a circular saw blade for sharpening. Some of these hold the blade in a fixed position while the grinding wheel, or similar grinding surface, is adjusted to different sharpening angles. Others have a fixed vertically oriented rotating grinding disc and adjust the fixture to different angles. An example of the latter is the fixture described in the Sattler U.S. Letters Pat. No. 3,364,797 dated Jan. 23, 1968. The biggest drawback of the prior fixtures, such as exemplified by Sattler, are that they are limited as to the number of tooth angles which can be sharpened or ground. Further, in most instances, in order to sharpen the blade at the angles within the fixtures capabilities, the saw blade usually has to be removed from the fixture to position it for sharpening opposite sides of the teeth or for sharpening teeth at opposite angles.

SUMMARY OF THE INVENTION

A horizontal base suitable for mounting on a horizontal reciprocable support table carries a circular turntable which can be rotated about a vertical axis. Mounted on the turntable is a vertically arranged cradle A carrier, having generally a sectored circular configuration movably rests in the cradle to be swung or rotated about a horizontal axis. The carrier has two parts, one of which can be pivotably moved with respect to the other about yet another axis. An angled arm attached to the carrier holds a circular saw blade arbor on which the saw blade is mounted for sharpening. The arbor can be moved to different positions along the arm to accommodate different sized saw blades By virtue of the fixture being movable about the various different axes, after being mounted in the arbor the saw blade can be angularly positioned with respect to a vertical rotating grinding wheel, or similar planar grinding surface, to sharpen the blade teeth at the required various angles and the saw blade can also be positioned so that the teeth can be ground on or from each side of the blade without removing the saw blade from the fixture.

As a further feature there is provided a tooth rest attached to the carrier which engages the saw blade at or near the tooth that is being ground for indexing the saw blade when it is rotated to advance each tooth into position for sharpening.

As yet another feature, two separate toothrests are provided so that if one interferes with the sharpening it can be swung out of the way and the other swung into indexing position.

The fixture of this invention can be moved about three different axes to position the circular saw blade for sharpening at a wide variety of tooth sharpening angles without removing the saw blade from the fixture and while keeping the teeth at the sharpening location with respect to the planar sharpening or grinding surface.

BRIEF DESCRIPTION OF THE DRAWING

FIG. 5 is a side view of the arrangement illustrated in FIG. 3 with the saw blade removed for clarity;

FIG. 7 is a side view showing the fixture tilted about one axis to hold a saw blade at an angulated position with respect to the grinding wheel for sharpening an angle on the saw blade teeth;

FIG. 9 is an end view looking at the grinding wheel and fixture illustrating the saw blade held horizontally by the fixture for grinding an angle on the saw blade teeth;

FIG. 9(a) illustrates the relationship of the grinding wheel surface to the tooth being sharpened when held as in FIG. 9;

FIG. 11 is a view from the same end as FIG. 8 showing the saw blade held by the fixture in a horizontal position with the fixture rotated 90° about a vertical axis;

FIG. 11(a) illustrates the relationship of the teeth to the grinding wheel in the arrangement of FIG. 11;

FIG. 12 is an end view similar to FIG. 11 showing the fixture tilted to position the saw blade at an angle to the horizontal for sharpening;

FIG. 12(a) shows the relationship of the grinding wheel to the teeth in the arrangement illustrated in FIG. 12;

FIG. 13 is an end view similar to FIG. 12 with the fixture tilted to position the saw blade at the opposite angle to that shown in FIG. 12;

FIG. 14 is a side view similar to FIG. 5 showing the fixture moved to the other edge of the wheel, rotated 180° about a vertical axis and rotated 90° about a horizontal axis;

FIG. 14(a) illustrates the relationship of the saw blade teeth to the grinding wheel in the arrangement illustrated in FIG. 14;

FIG. 15 is a sectioned view of a portion of the carrier to show the details of its construction;

FIG. 16 is a vertical section of a portion of the carrier and cradle showing details of the construction;

FIG. 17 illustrates the manner in which tooth rest support and index devices are mounted on the carrier of the fixture;

FIG. 18 is a sectioned detail of a part of the tooth rest to show its construction; and FIG. 19 is a more detailed illustration of the construction and operation of the tooth rest.

DESCRIPTION OF THE PREFERRED EMBODIMENT

Figure 1:
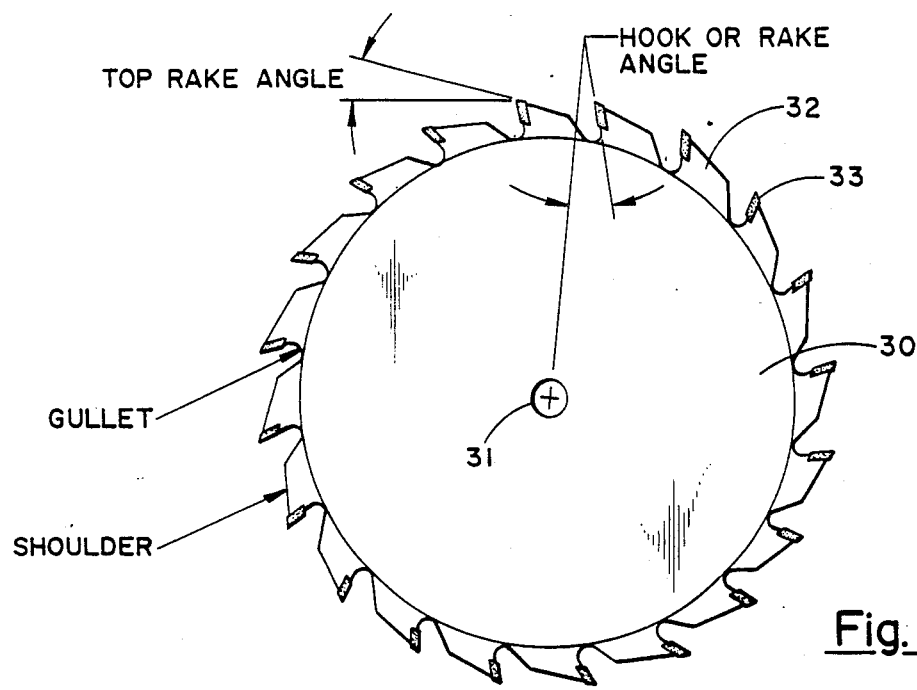
FIG. 1 is a plan view of a typical and conventional circular saw blade illustrating some of the tooth angles which can be sharpened in the fixture of the present invention.
Figure 2:
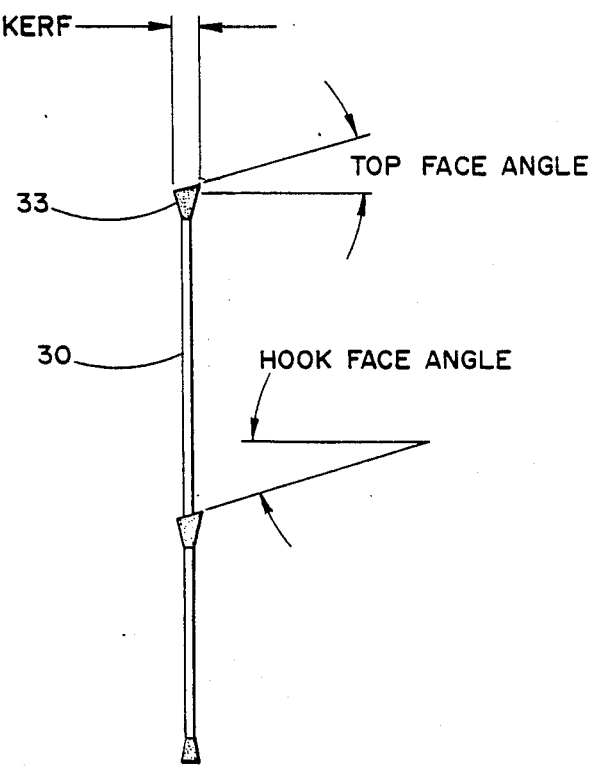
FIG. 2 is a partial edge view of the blade shown in FIG. 1.
Figure 3:
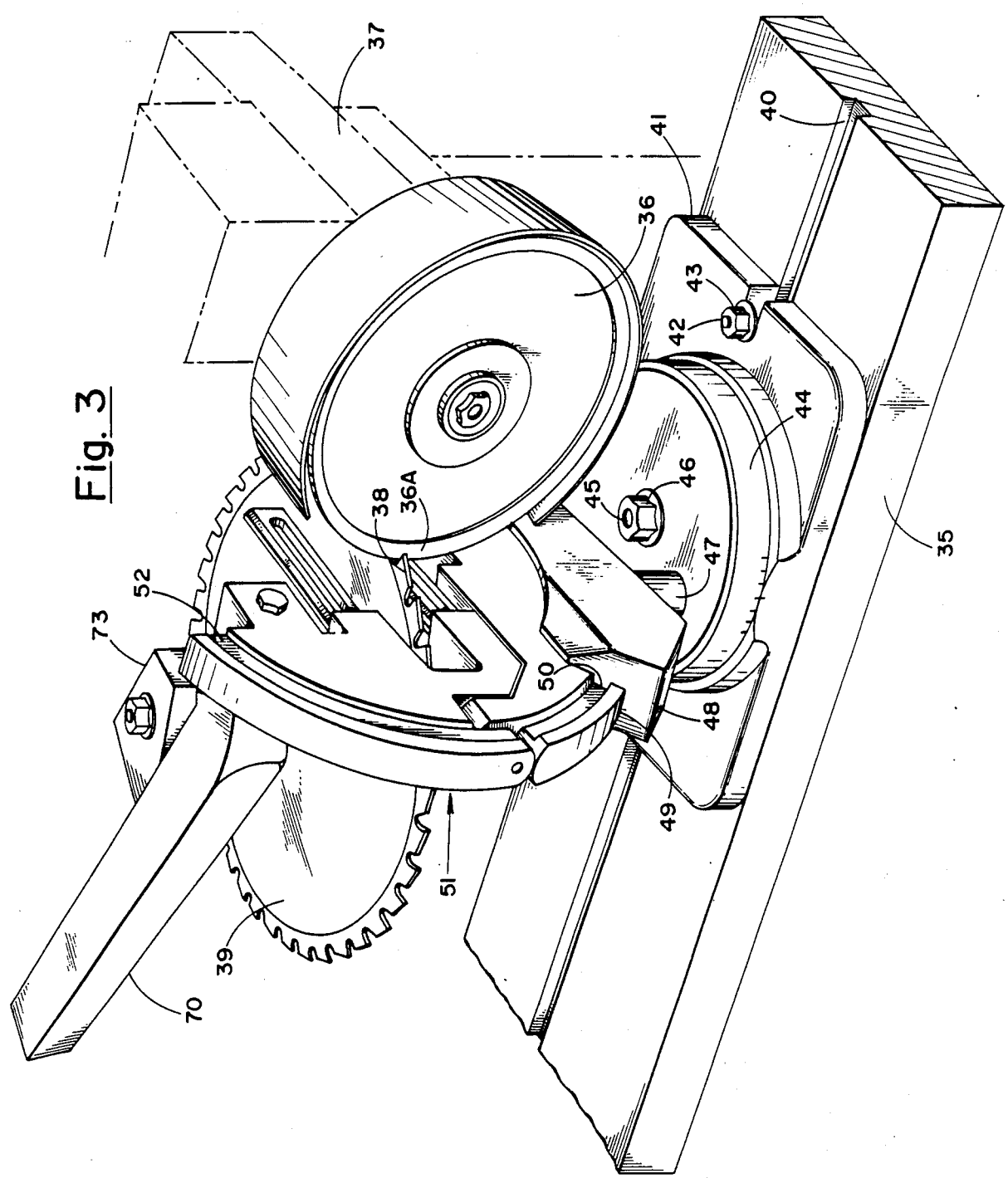
FIG. 3 is a perspective view of a preferred embodiment of the fixture of the instant invention mounted on table and in relation to a vertical grinding or sharpening wheel.
Figure 4:
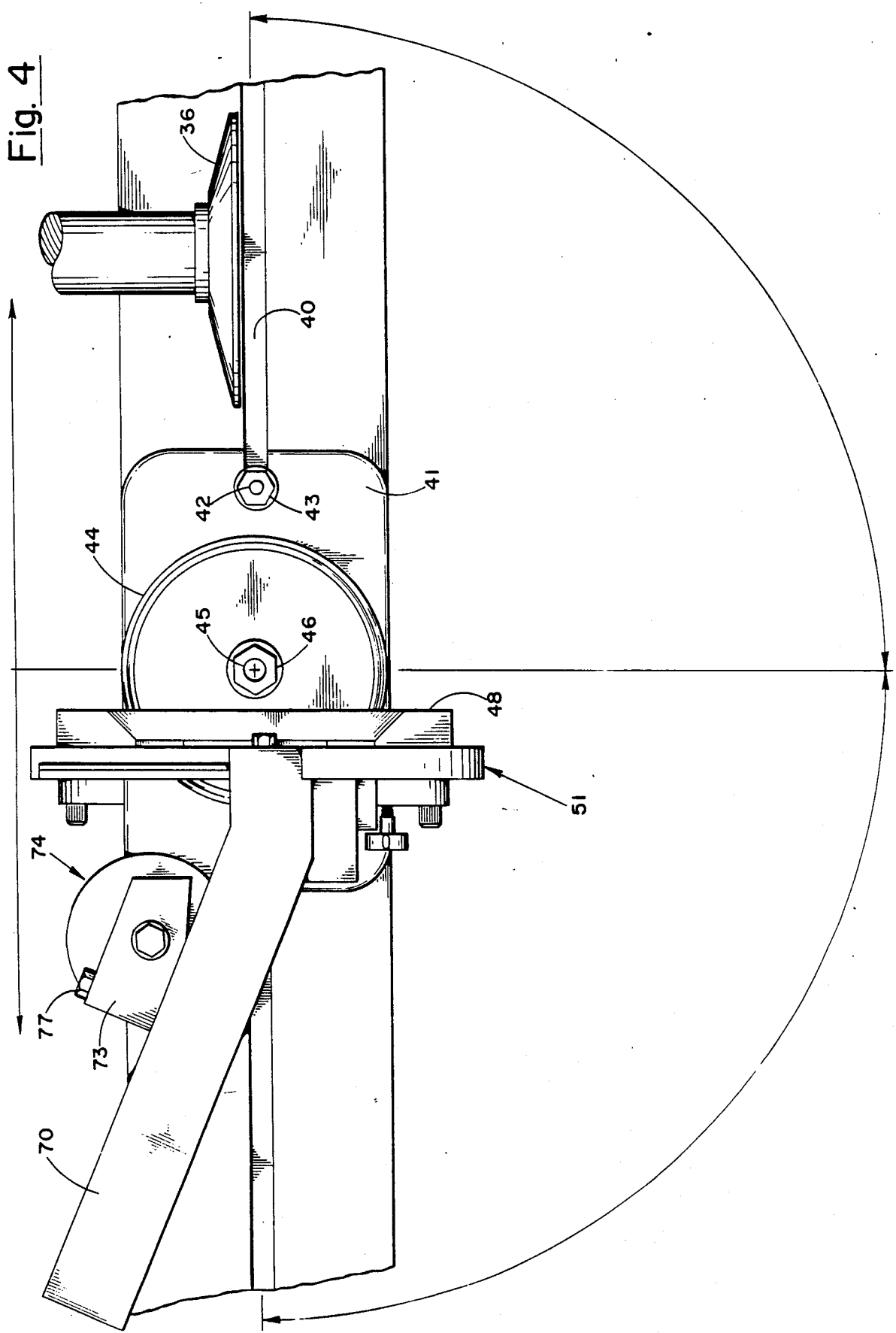
FIG. 4 is a top view of the arrangement illustrated in FIG. 3 with the saw blade removed for clarity.

FIGS. 1 and 2 are intended to merely illustrate the general character and construction of a conventional typical circular saw blade and to identify, for descriptive purposes, some of the various tooth angles and other parts of the saw blade which may be referred to from time to time during the course of the detailed description of the instant invention. The illustrated saw blade is intended to be merely illustrative and not limitative. Typically, the saw blade has a relatively thin main plate or body 30, the blade thickness generally being designated with a suitable standard gauge number. The flat surfaces of the body may be referred to as "faces" or "sides". The centrally located arbor hole 31 is for mounting the saw blade on the power device which normally drives it when in use and is also used for mounting the saw on the fixture of the instant invention. The arbor hole diameter is different for different sized saw blades and the arbor used in the instant invention is constructed conventionally to accommodate various diameter mounting holes such as illustrated in the previously mentioned Sattler U.S. Pat. No. 3,364,797. Typically and conventionally the saw blade teeth 32 are spaced along and around the circumferential outer edge of the body 30 and each tooth has a carbide tip 33 at the cutting edge. The inner curved portion of the tooth body may be referred to as the gullet and the outer sloped edge of the tooth body may be referred to as the shoulder. The carbide tip 33 which does the actual cutting is the portion of the saw blade which is sharpened utilizing the holding fixture of the instant invention. In general in the description and the claims, reference to a saw tooth should be understood to mean the cutting portion of the saw blade tooth.

In FIGS. 1 and 2 some of the tooth cutting angles which must be sharpened are defined and illustrated. In general these angles are defined by terminology which is standard in the industry; however, no limitation to the specific definition utilized in this description is intended. The terms used are only intended to be illustrative and the terminology is used for descriptive purposes only. Those of ordinary skill in the art will readily recognize the nomenclature used in describing the operation of the invention.

In general circular saw blades range widely in diameter and, as will be described in greater detail later, the instant invention is constructed to accommodate a wide range of differing diameter circular saw blades. Also, in general, the pattern of the saw blade teeth may vary greatly from saw to saw. In some saw blades all the teeth are identical and may have very simple cutting edges. Others may have alternate teeth identical or only every third (or more) teeth and each group of identical teeth may have different cutting angles. Some of the tooth cutting angles are quite complex as is well known by those of ordinary skill in the art. No attempt will be made here to describe in detail all of the various cutting angles that a saw blade tooth may have but it will be shown that the construction and operation of the instant invention is such to accommodate virtually all, if not all, of the cutting angles for sharpening.

Referring now to the other figures and, initially, particularly with reference to FIGS. 3–6, the holding fixture of the instant invention is supported on a conventional horizontal reciprocable support table 35. A vertically oriented circular grinding or sharpening wheel 36 driven by some suitable power source designated generally by reference numeral 37 is conventionally mounted to a support means, not shown. The grinding wheel 36 and its associated power source 37 are conventional commercially available devices and do not constitute part of the instant invention. Typically and conventionally, the grinding wheel 36 is circular and has a shallow dish shape with a planar diamond, or other suitable abrasive material, grinding strip 36A around the edge of the wheel which is brought in contact with a tooth 38 of a circular saw blade 39 for sharpening as the grinding wheel 36 is rotated at a relatively high speed by its power source 37. The invention can also be used with other planar grinding surfaces such as a grinding belt. For ease of explanation the views of the fixture shown in the drawings are designated with relation to the supporting table. In conventional fashion the top of the horizontal mounting table 36 has an elongated guide slot 40 and a horizontal base member 41 of the fixture of the instant invention has guide posts 42 extending downward onto the slot which are threaded at one end to be detachably locked at selected locations by nuts 43. This permits the fixture to be slidably moved to position it on the support table 35 with respect to the grinding wheel 36 which is generally at a fixed location. Mounted on top of base member 41 is a turntable 44 which is rotatably attached to base member 41 at its vertical pivot axis by a pivot bolt or pin 45. Nut 46 is threaded on an end of bolt 45 to lock the turntable at any rotated position that it is set to. A pair of short posts or pillars 47 (only one shown in FIG. 3) extend upward from the top of turntable 44 to support a cradle member 48. Cradle member 48 has an arcuate or curved open-top groove 49 and a ledge 50 extending inward into the groove. Nested in groove 49 is a generally sectored circular carrier, designated generally by reference numeral 51. The outer circumference of carrier 51 has the same curvature as groove 49 so that the carrier can be slidably moved in cradle member 48 as carrier is rotated about a horizontal axis. A shallow slot 52 is formed on one face of the carrier to accommodate the ledge 50 to guide and hold the carrier plate in place in the cradle groove 49.

Carrier 51 comprises two separate pieces. As shown most clearly in FIG. 15 each piece has the general configuration of a sector of a circle. In the orientation illustrated in FIG. 15 an upper piece 55 has a descending protrusion or lip 56 which overlays an upward extending protrusion or lip 57 from the lower piece 58. Lip 57 contains a female, double cone hardened insert 53 and hardened, conical-ended screws 59 and 54 engage the opposite ends of insert 53 to pivotably join together the two pieces of the carrier. If any wear occurs, screws 59 and 54 can be snugged down into insert 53. In the orientation illustrated in FIG. 15 it can then be observed that with the lower piece 58 nested in cradle 48 the upper piece 55 can be pivotably swung about the axis defined by screws 59 and 54.

Figure 6:
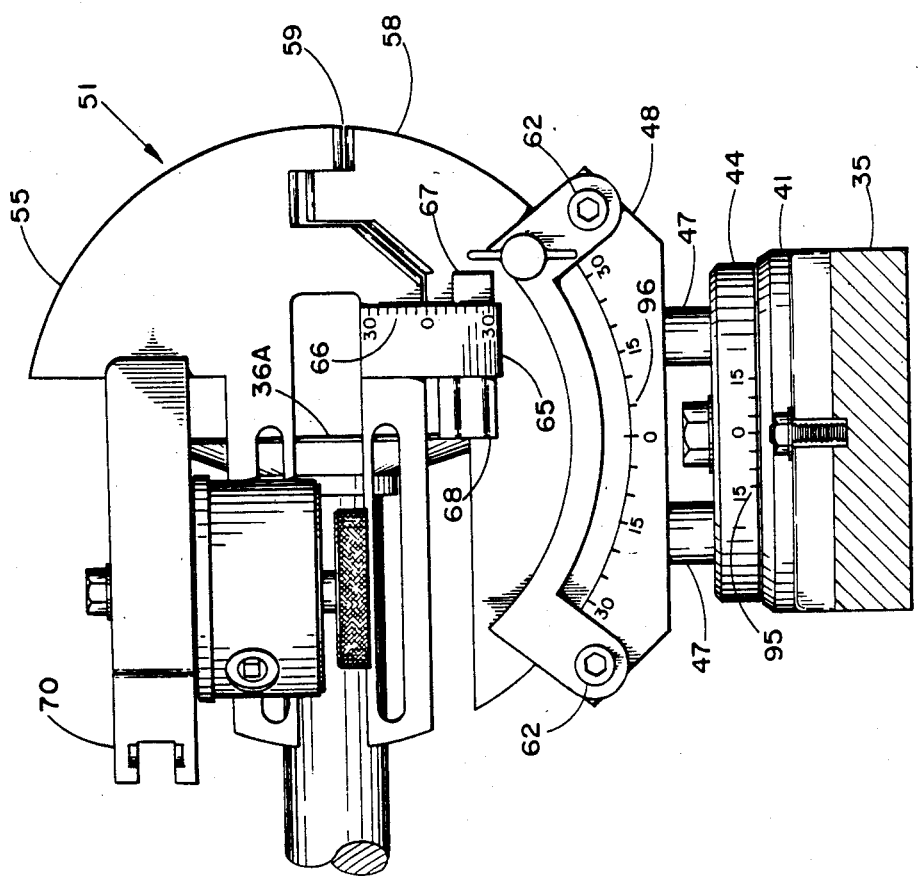
FIG. 6 is an end view of the arrangement illustrated in FIG. 3 with the saw blade and grinding wheel removed for clarity.

As seen most clearly in FIGS. 5, 7 and 16 cradle 48 comprises a block member 60 and a plate member 61 with the groove 49 formed by the gap between members 60 and 61. Plate member 61 and block member 60 are attached to one another at their ends by threaded bolts 62. A wing-headed pressure bolt 63 is threaded through plate member 61 so that its end will bear against a face of carrier piece 58 to lock it in position in cradle 48. In that fashion then the carrier can be manually rotated about a horizontal axis as desired and then temporarily locked in set position by bolt 63. Extending out from one face or side of carrierpiece 55 and extending downward from the lower edge thereof is an arcuate guide arm 65, see, for example, FIGS. 3, 5, 6 and 16. Extending out from one side or face of carrier piece 58 are pads 67 and 68 on each side of the guide arm 65. Threaded through pad 68 is a set screw or pressure bolt 69 which has one end for bearing against the side of guide arm 65 to lock it in position after it has been set to the desired pivoted position about axis 59. As seen in FIG. 6, a scale 66 is engraved or printed on arm 65 to visually show the pivot angle of carrier piece 55.

Attached to and extending outward from one side or face of carrier piece 55 is an elongated angulated arm 70 having a general rectangular cross-section. Along one side of arm 70 is an elongated guide way slot 71 for receiving a guide post 72 extending out from a bearing block 73. Rotatably attached to bearing block 73, in conventional fashion, is a saw arbor 74 having a knurled holding plate 75 which is threadably engaged with the main body 76 of arbor 74 to hold a saw blade at its center mounting or arbor hole in conventional style. While not shown in any detail in any of the drawings and not intended to be a part of the instant invention, the arbor includes means which can expand or contract to accommodate different sized mounting holes for different sized circular saws. The bearing block 73 which carries arbor 74 can be selectively moved along slot 71 in arm 70 and manually locked in place with bolt 77. This permits bearing block 73 to be adjustably set on arm 70 to accommodate different sized saw blades. As a result of the angle of arm 70, regardless of the location of bearing block 73 along arm 70, the teeth of the blade mounted on the arbor will be located at the sharpening position.

From the foregoing it can be seen that the fixture provides a gimbal system with three axes of rotation with the tooth sharpening position being generally at the center of the gimbal system. A wide range of different sized saw blades can be held and positioned at the various angles necessary to sharpen the various tooth angles.

Figure 8:
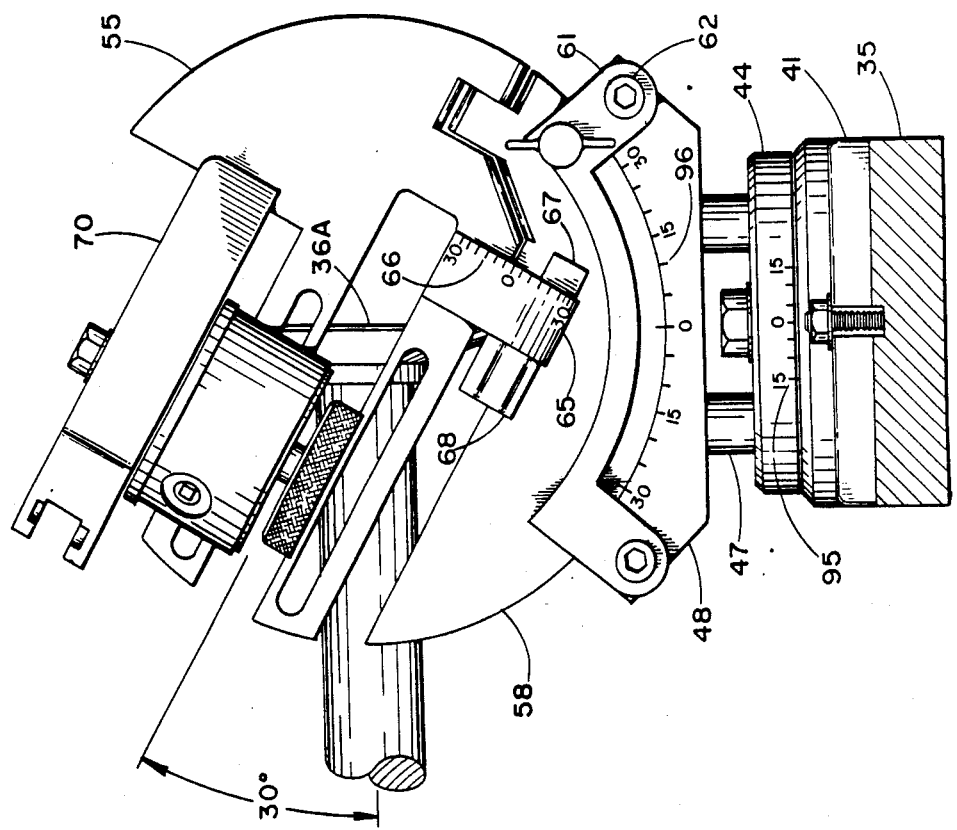
FIG. 8 is an end view showing the fixture rotated about another axis to hold the saw blade at another angled position for sharpening another angle on the saw blade teeth.

For one example, with reference to FIG. 5, the saw blade, not shown for clarity, is mounted in arbor 74 in a horizontal position and the arbor is located on arm 70 such that the teeth of the saw blade pass through a gap 81 between the two pieces 55 and 58 of carrier 51 into an area where the teeth can contact grinding wheel 36. In the FIG. 5 example, the two pieces 55 and 58 of carrier 51 are in the same vertical plane and locked in position by set screw 69 and carrier 51 is locked in position in cradle 48 by winged screw 63 so that the saw blade is held in a substantially horizontal position. As shown in FIG. 8, a scale 96 is provided to observe the angular positioning of carrier 51 in cradle 48. With the saw blade held as described and the base 41 locked in position by tightening nuts 43, the reciprocable table on which base 41 is mounted is moved to position the fixture so that the grinding surface 36A of grinding wheel 36 is in contact with a tooth of the saw blade and power for rotating grinding wheel 36 is then applied. This would be an example of sharpening a saw blade tooth having a hook face of zero degree angle. As another example, referring to FIG. 7 the carrier piece 55 may be pivotably swung about axis 59 to tilt the saw blade as much as ±30° with respect to the horizontal to provide for sharpening a saw tooth blade having a hook face angle in the range of ±30°.

After the tooth is sharpened, the reciprocable table is moved back until the blade tooth clears the grinding wheel, the saw blade is then rotated in the arbor to bring the next tooth into sharpening position and the reciprocable table is again moved to bring the tooth into contact with the sharpening surface. Conventionally, stops (not shown) are set on the reciprocable table to automatically control the back and forth movement and positioning of the table.

Figure 10A:
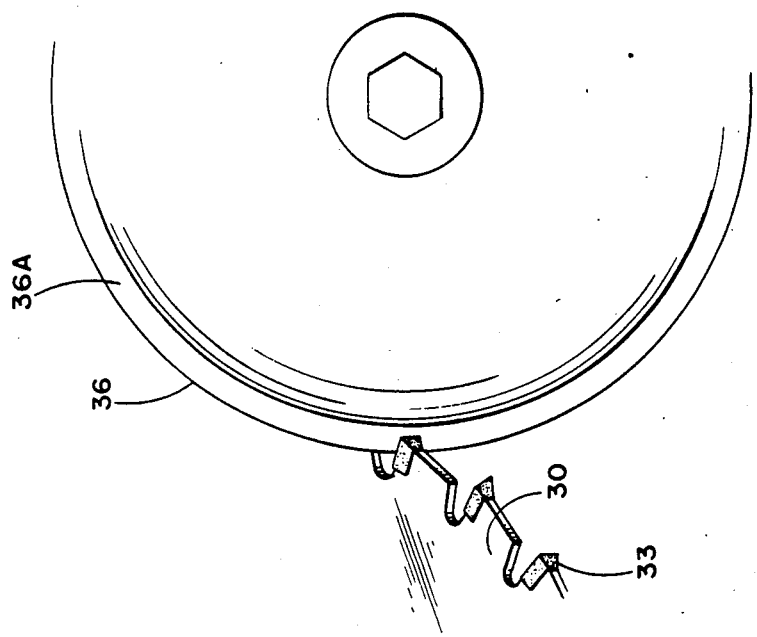
FIG. 10(a) illustrates the relationship of the teeth to the grinding wheel in the arrangement of FIG. 10.
Figure 10:
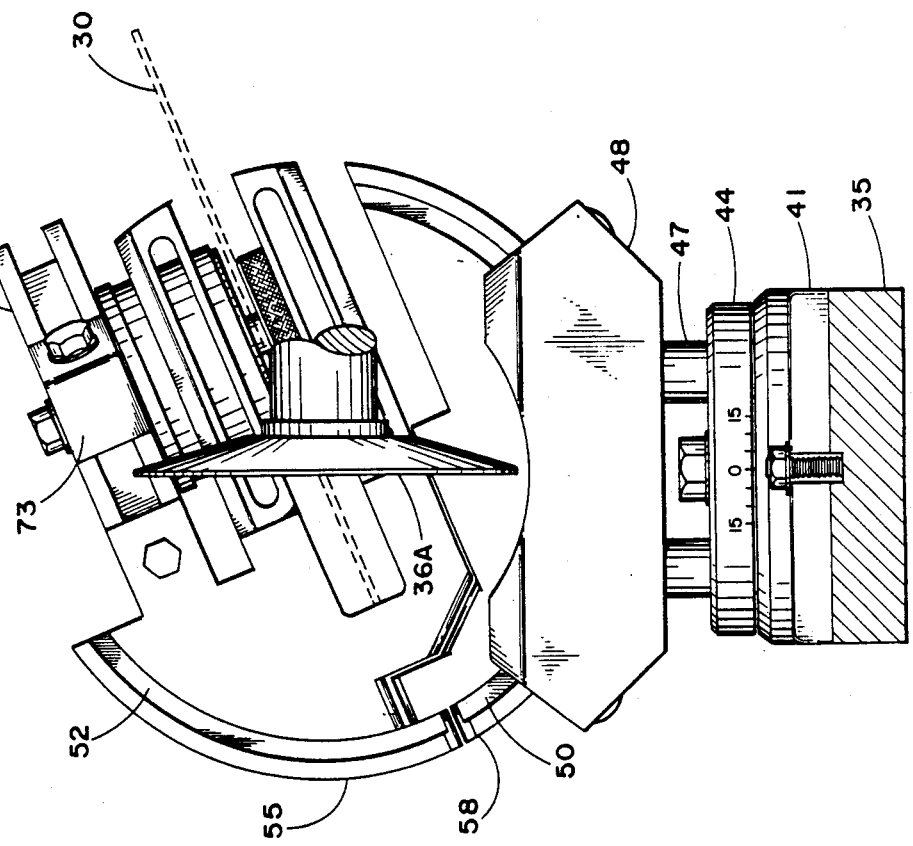
FIG. 10 is a view from the same end as FIG. 9 showing the fixture in the same position as in FIG. 8.

As yet another example, FIG. 9 illustrates an initial setting of the fixture with respect to the grinding wheel similar to that of FIG. 5 for sharpening a saw blade tooth having a rake face angle of zero degrees. As then illustrated in FIG. 10, the carrier 51 can be rotated about a horizontal axis in cradle 48 by loosening the winged bolt 63 to tilt the saw blade in the range of about ±30° with respect to the horizontal for sharpening saw blade teeth having rake face angles in that range. FIG. 10(a) illustrates an example of alternate teeth having opposite rake angles, e.g., one tooth having ±30° rake angle and the next tooth having −30° rake angle. In the operation of the invention, the fixture would be set to accommodate the sharpening of one of the rake angles and every other tooth would then be brought into grinding relationship with the grinding wheel by rotating the blade in arbor 76 until all teeth with that rake angle are sharpened. Then the fixture would be set to the other or opposite rake angle and all the alternate teeth would be sharpened.

As still another example, FIG. 11 illustrates the fixture swung 90° about the vertical axis defined by bolt 45 by rotating turntable 44 and then locking it in position by tightening nut 46. This will then bring the teeth of the saw blade into position with respect to the vertically oriented grinding surface 36A to sharpen the top face angle with the blade held horizontally as in FIG. 11, i.e., to accommodate a top face angle of zero degrees. In FIG. 12 the fixture is shown with the top piece 55 of carrier 51 rotated about pivot axis 59 and locked in place with set screw 69 so that the saw blade is tilted for sharpening a top face angle other than zero degrees. In the illustration the angle is about 30°. The fixture can be swung about axis 59 in the opposite direction to accommodate opposite facing top face angles as illustrated in FIG. 13.

Continuing with the examples, FIG. 14 shows the fixture turntable rotated about axis 45 an additional 90° from that shown in FIG. 12, or 180° from that shown in FIG. 5, and carrier 51 swung 180° from the position illustrated in FIG. 5 to place the saw blade in a vertical plane and to bring the side of the saw blade in grinding contact with grinding surface 36A to accommodate sharpening of the side angles. As illustrated in FIG. 14, generally these angles are quite small, ranging in the order from about zero to about two degrees, so carrier 51 is moved in cradle member 48 by hand and set by eye to the proper angle. It can be readily seen that turntable 44 can be rotated about the vertical axis 45 to bring the other side or surface of the blade into sharpening contact with the sharpening strip 36A. As shown in FIG. 5, for example, turntable 44 has a scale 95 which can be used to manually observe the proper rotational setting. Similarly, a suitable scale 66 is provided on arm 65 for visually observing the correct positioning of carrier piece 55 with respect to carrier piece 58.

Turning next to FIGS. 17-19, the body of piece 55 of carrier 51 includes a pair of extending slotted arms 79 and 80 with the gap 81 between the two arms being the area in which the saw blade extends for bringing the teeth in touch with the sharpening wheel. For clarity, the saw blade is not shown in FIG. 17. Attached to each of the arms 79 and 80 are tooth rest assemblies 82 and 83. For purposes of explanation and as illustrated in FIG. 17, tooth rest 82 can be considered to be the upper tooth rest and 83 the lower tooth rest. The assemblies are identical except that in use, as is apparent from FIG. 17, each contacts the saw blade teeth from opposite sides of the blade. Tooth rest 82 includes a body member 88 with a reduced thickness section 84 dimensioned to fit snugly yet slidably in slot 85 of arm 79 against shoulder 78 so that the tooth rest assembly can be adjustably, set to the desired position in slot 85. A bolt 86 with washer 87 secures tooth rest 82 after it is set in position in slot 85. Threaded through the thicker portion of block member 83 is a set screw 89 which can be adjustably set to have one end bear against a face of the saw blade when it is positioned for sharpening to provide support to the saw blade in the area of the tooth being sharpened and to minimize chattering. Attached to the other side of body member 83 by a pivot pin 90 is an elongated arm 91. A ratchet arrangement permits arm 91 to be swung a fixed distance. As illustrated in FIG. 17, arm 91 of the upper tooth rest 82 is swung downward. Correspondingly, arm 91 of the lower tooth rest 83 can be swung upward. Arm 91 is terminated at one end 92 with a pyramidal configuration designed to set in the gullet area of the saw blade tooth to provide indexing of the teeth when the blade is rotated in the arbor to bring each tooth in position for sharpening. The ratchet arrangement comprises a post 93 extending from body 83 and a spring encased pin 94 attached between the post 93 and the other end of arm 91. Post 93 is pivotally inserted in body 83 and, while not clearly shown in the drawing, is designed to limit the range of swing of the arm 91. The configuration of the pyramidal ending 92, along with the ratchet arrangement, allows the saw blade to be rotated in the arbor in one direction for positioning each tooth for sharpening by the blade as it is rotated, pushing the end of arm 91 out of the gullet area of the tooth but arm 91 being biased to snap or click into place in the gullet area of the next adjacent tooth which is brought into sharpening position. In this fashion, then, once tooth rest assembly 82 and/or 83 has been set and locked into place with bolt 86 and washer 87 for a given saw blade, it will index each successive saw blade tooth as the saw blade is rotated manually in the arbor to bring each tooth in position for sharpening. In general, either the upper or the lower tooth rest assemblies, as viewed in FIG. 17, is used for a given sharpening operation although in some cases both the upper and lower tooth rest assemblies can be used at the same time. If the tooth rest is not being used for indexing in the manner described, arm 91 is merely swung out of position as illustrated by the location of the lower tooth rest assembly 83 in FIG. 17. The feature of having two tooth rests on opposite sides of the blade permits the blade to be sharpened from either side while providing the tooth indexing from the opposite side. In prior devices having only a single tooth rest the blade as to be removed from its holding fixture and turned over for sharpening from the opposite side because otherwise the tooth rest interfered with sharpening.

I claim:

1. A fixture for holding a circular saw blade for sharpening by a powered, vertically oriented planar grinding surface comprising:
   a horizontal base member movably mounted on a horizontal reciprocable support table;
   a horizontal turntable rotatably mounted on said base for rotating said turntable about a vertical axis;
   means for releasably locking said turntable at selected rotated positions;
   vertically oriented cradle means attached to and extending upward from said turntable, said cradle means having an open-top arcuate groove;
   a two-piece sectioned circular carrier having front and back faces and having an outer circumference of the same curvature as the arcuate groove in said cradle means;
   said two-piece carrier including means pivotably attaching one piece of said carrier to the other piece about an axis in the plane of said other piece for swinging said one piece in and out of the plane of said other piece, means for detachably locking said pieces at selected pivoted positions, and slot means on a face of said carrier adjacent and paralleling the circumference of said carrier plate for slidably engaging the groove in said cradle means for moving said carrier about a horizontal axis;
   means coupled to said cradle means for releasably locking said carrier in said cradle groove at selected positions;
   an elongated angled arm attached to and extending away from a face of said carrier;
   a saw mounting arbor for releasably holding a circular saw blade at its center of rotation;
   means for movably coupling said arbor to said arm;
   means for releasably clamping said arbor to said arm;
   said carrier further having an opening through which at least part of the toothed edge of a saw blade mounted in said arbor extends for contacting a vertically. oriented planar grinding surface for sharpening.

2. The invention as described in claim 1 further including:
   tooth rest means removably attached to said carrier for releasably engaging a tooth of a saw blade mounted on said arbor.

3. The invention as described in claim 1 wherein said means pivotably attaching said one piece to said other piece of said carrier comprises:
   a lip extending out from said one piece;
   a lip extending out from said other piece and overlaying said first mentioned lip; and
   pivot means passing at least partway through each of said lips.

4. The invention as described in claim 1 wherein said means for detachably locking said pieces of said carrier at selected pivoted positions comprises:
   an arcuate arm extending outward from a face of said one piece of said carrier;
   pads attached to said other piece of said carrier on opposite sides of said arcuate arm; and
   pressure bolt means threadably passing through one of said pads for bringing one end to bear against a side of said arcuate arm.

5. The invention as described in claim 1 wherein said angled arm is attached to said one piece of said carrier.

6. The invention as described in claim 5 wherein said means for movably coupling said arbor to said arm comprises:
    an elongated slot in said arm;
    a block attached to said arbor; and
    a ledge protruding out from a side of said block for engaging the slot in said arm.

7. The invention as described in claim 1 further including:
    tooth rest means removably attached to said carrier for selectively releasably engaging a tooth of a saw blade mounted in said arbor from both sides of said blade.

8. A gimbal-like fixture having three axes of rotation for holding a circular saw blade for sharpening each saw blade tooth by a powered planar grinding surface, comprising:
    a base member for mounting on a reciprocable support member;
    a turntable member rotatably mounted on said base member for rotating said turntable member about a first axis;
    means for releasably locking said turntable member at selected rotated positions;
    cradle means fixedly attached to said turntable member, said cradle means having an arcuate groove;
    a two-piece, generally circular carrier having parallel opposite faces, said carrier slidably engaged along a portion of its outer edge in said cradle means groove whereby said carrier is rotatable about a second axis;
    means coupled to said carrier for releasably locking said carrier at selected rotated positions in said cradle groove;
    means for pivotably attaching one piece of said carrier to the other piece of said carrier whereby said one piece can be pivotally swung about a third axis;
    an elongated angled arm attached at one end to a face of said one carrier piece;
    a saw mounting arbor for rotatably holding a circular saw at its center;
    means for removably clamping said arbor to said arm;
    said carrier having an opening through which at least part of the toothed edge of a saw blade mounted in said arbor extends for a saw blade tooth to contact a planar grinding surface for sharpening;
    the arrangement being such that the center of the gimbal-like fixture is about at the tooth sharpening position.

* * * * *